United States Patent
Arunachalam

(10) Patent No.: US 10,133,857 B2
(45) Date of Patent: Nov. 20, 2018

(54) PHALANGEAL AUTHENTICATION DEVICE

(71) Applicant: BANK OF AMERICA CORPORATION, Charlotte, NC (US)

(72) Inventor: Annamalai Arunachalam, Singapore (SG)

(73) Assignee: Bank of America Corporation, Charlotte, NC (US)

( * ) Notice: Subject to any disclaimer, the term of this patent is extended or adjusted under 35 U.S.C. 154(b) by 204 days.

(21) Appl. No.: 15/158,465

(22) Filed: May 18, 2016

(65) Prior Publication Data

US 2017/0337362 A1 Nov. 23, 2017

(51) Int. Cl.
*H04L 29/06* (2006.01)
*G06F 21/32* (2013.01)

(52) U.S. Cl.
CPC .......... *G06F 21/32* (2013.01); *H04L 63/0861* (2013.01)

(58) Field of Classification Search
CPC .............................. G06F 21/32; H04L 63/0861
See application file for complete search history.

(56) References Cited

U.S. PATENT DOCUMENTS

| | | | | |
|---|---|---|---|---|
| 5,291,560 A * | 3/1994 | Daugman | ............ | A61B 5/1171 382/117 |
| 6,160,903 A * | 12/2000 | Hamid | ............... | G07C 9/00158 382/115 |
| 6,256,737 B1 * | 7/2001 | Bianco | ................... | G06F 21/32 713/186 |
| 6,792,287 B1 * | 9/2004 | Tuomela | ............ | G07C 9/00158 340/5.83 |
| 7,305,562 B1 * | 12/2007 | Bianco | .................... | H04L 63/08 709/229 |
| 7,454,624 B2 * | 11/2008 | LaCous | .................. | G06F 21/32 713/186 |
| 7,630,522 B2 * | 12/2009 | Popp | .................. | G06K 9/00912 382/115 |
| 7,685,629 B1 * | 3/2010 | White | ................ | G06Q 20/3674 705/67 |
| 8,073,732 B1 | 12/2011 | Ghosh et al. | | |
| 8,116,453 B2 | 2/2012 | Shnowske et al. | | |
| 8,200,708 B2 | 6/2012 | Ghosh et al. | | |
| 8,355,969 B2 | 1/2013 | Orr | | |

(Continued)

OTHER PUBLICATIONS

Berkay Topcu et al., Fingerprint Matching Utilizing Non-Distal Phalanges, 21st International Conference on Pattern Recognition (ICPR 2012), Nov. 11-15, 2012.*

(Continued)

*Primary Examiner* — David Garcia Cervetti
(74) *Attorney, Agent, or Firm* — Michael A. Springs; Moore & Van Allen PLLC; Nicholas C. Russell

(57) ABSTRACT

In general, apparatuses, methods and computer program products for phalangeal authentication of a user are disclosed. A phalangeal authentication device is provided that is configured for capture, customization and transformation of one or more phalangeal credentials of a user. The phalangeal authentication credentials of the user are captured using phalangeal credential sensor devices. The captured phalangeal credentials are analyzed to determine an associated user activity. The user activity is initiated, automatically, in response to the successful validation of the phalangeal credentials.

20 Claims, 6 Drawing Sheets

(56) References Cited

U.S. PATENT DOCUMENTS

| | | | |
|---|---|---|---|
| 8,412,605 B2 | 4/2013 | Griffin et al. | |
| 8,489,887 B1 | 7/2013 | Newman et al. | |
| 8,504,456 B2 | 8/2013 | Griffin et al. | |
| 8,522,037 B1 | 8/2013 | Shnowske et al. | |
| 8,527,414 B2 | 9/2013 | Ross et al. | |
| 8,572,714 B2 | 10/2013 | Radhakrishnan | |
| 8,693,737 B1 | 4/2014 | Newman et al. | |
| 8,726,341 B2 | 5/2014 | Radhakrishnan | |
| 8,823,488 B2* | 9/2014 | Wellhoefer | G06F 19/3406 340/5.82 |
| 8,931,071 B2 | 1/2015 | Newman et al. | |
| 8,984,596 B2* | 3/2015 | Griffin | G06F 21/32 340/5.83 |
| 9,043,609 B2 | 5/2015 | Calman | |
| 9,135,419 B2 | 9/2015 | Newman et al. | |
| 9,204,298 B2 | 12/2015 | Frew et al. | |
| 9,215,321 B2 | 12/2015 | Timem et al. | |
| 9,361,507 B1* | 6/2016 | Hoyos | G06K 9/00073 |
| 9,477,988 B2* | 10/2016 | Haggerty | G06Q 40/025 |
| 9,582,705 B2* | 2/2017 | Du | G06K 9/00033 |
| 9,652,061 B2* | 5/2017 | North | G06F 3/041 |
| 9,665,763 B2* | 5/2017 | Du | G06K 9/0002 |
| 9,711,060 B1* | 7/2017 | Lusted | G09B 19/00 |
| 9,733,821 B2* | 8/2017 | Fleizach | G06F 3/0487 |
| 9,785,823 B2* | 10/2017 | Mather | G06T 7/11 |
| 9,817,956 B2* | 11/2017 | Holz | G06F 21/31 |
| 9,841,815 B2* | 12/2017 | Clausen | G06F 3/014 |
| 2003/0029913 A1* | 2/2003 | Tsukamoto | G06K 9/00006 235/382 |
| 2005/0069177 A1* | 3/2005 | Bezvershenko | A61B 5/1075 382/115 |
| 2005/0125295 A1* | 6/2005 | Tidwell | G06Q 20/042 705/16 |
| 2005/0125296 A1* | 6/2005 | Tidwell | G06Q 20/042 705/16 |
| 2005/0125337 A1* | 6/2005 | Tidwell | G06Q 20/042 705/39 |
| 2005/0125338 A1* | 6/2005 | Tidwell | G06Q 20/10 705/39 |
| 2005/0125339 A1* | 6/2005 | Tidwell | G06Q 20/042 705/39 |
| 2005/0125350 A1* | 6/2005 | Tidwell | G06Q 20/04 705/42 |
| 2005/0125360 A1* | 6/2005 | Tidwell | G06Q 20/042 705/65 |
| 2005/0206721 A1* | 9/2005 | Bushmitch | H04M 3/42348 348/14.09 |
| 2006/0075256 A1* | 4/2006 | Hagiwara | G06F 21/32 713/186 |
| 2006/0090079 A1* | 4/2006 | Oh | G07C 9/00087 713/186 |
| 2006/0147096 A1* | 7/2006 | Lee | G06K 9/00067 382/124 |
| 2006/0190836 A1* | 8/2006 | Ling Su | G06F 1/1616 715/773 |
| 2007/0198850 A1* | 8/2007 | Martin | G07C 9/00087 713/186 |
| 2007/0211921 A1* | 9/2007 | Popp | G06K 9/0004 382/115 |
| 2009/0028395 A1* | 1/2009 | Riionheimo | G06F 3/04883 382/124 |
| 2010/0138914 A1* | 6/2010 | Davis | G06F 21/32 726/19 |
| 2010/0182126 A1* | 7/2010 | Martis | A61B 5/1172 340/5.83 |
| 2011/0102141 A1* | 5/2011 | Wu | G06K 19/06187 340/5.82 |
| 2011/0129124 A1* | 6/2011 | Givon | G06F 3/011 382/107 |
| 2011/0129128 A1* | 6/2011 | Makimoto | G06K 9/00013 382/124 |
| 2011/0184865 A1* | 7/2011 | Mon | G06Q 20/1085 705/43 |
| 2011/0213709 A1* | 9/2011 | Newman | G06F 21/32 705/44 |
| 2011/0299740 A1* | 12/2011 | Mori | A61B 5/0059 382/115 |
| 2012/0016798 A1* | 1/2012 | Carper | G06Q 20/1085 705/43 |
| 2012/0321150 A1* | 12/2012 | Ranganathan | G06F 3/0488 382/124 |
| 2013/0046645 A1 | 2/2013 | Grigg et al. | |
| 2013/0212645 A1* | 8/2013 | Takahashi | H04L 9/3231 726/3 |
| 2014/0046841 A1 | 2/2014 | Gauvin et al. | |
| 2014/0079300 A1* | 3/2014 | Wolfer | G06K 9/00013 382/124 |
| 2014/0313007 A1* | 10/2014 | Harding | G07C 9/00158 340/5.52 |
| 2014/0379339 A1 | 12/2014 | Timem et al. | |
| 2015/0066772 A1 | 3/2015 | Griffin et al. | |
| 2015/0070284 A1* | 3/2015 | Clausen | G06F 3/014 345/173 |
| 2015/0095028 A1 | 4/2015 | Karpey et al. | |
| 2015/0161461 A1* | 6/2015 | McNulty | G06K 9/00073 382/116 |
| 2015/0227937 A1* | 8/2015 | Giles | G06Q 20/40145 705/44 |
| 2015/0287017 A1* | 10/2015 | Iqbal | G06Q 20/3223 705/44 |
| 2015/0287018 A1* | 10/2015 | Iqbal | G06Q 20/3223 705/44 |
| 2015/0319294 A1* | 11/2015 | Sudhir | H04M 1/72541 455/411 |
| 2015/0332274 A1* | 11/2015 | Prodam | G07F 19/20 705/18 |
| 2015/0347805 A1* | 12/2015 | McNulty | G06K 9/00033 382/124 |
| 2016/0011767 A1* | 1/2016 | Jung | G06F 3/0488 715/847 |
| 2016/0014121 A1* | 1/2016 | Perna | G06K 9/0061 726/4 |
| 2016/0127900 A1* | 5/2016 | John Archibald | H04W 12/06 726/7 |
| 2016/0171192 A1* | 6/2016 | Holz | G06F 21/31 726/19 |
| 2016/0188849 A1* | 6/2016 | Eramian | G06F 21/316 726/5 |
| 2016/0189161 A1* | 6/2016 | Eramian | G06Q 20/40145 705/44 |
| 2016/0269402 A1* | 9/2016 | Carter | H04L 9/0816 |
| 2016/0294555 A1* | 10/2016 | Jakobsson | H04L 9/0836 |
| 2016/0313806 A1* | 10/2016 | Zhao | G06F 3/0346 |
| 2016/0350581 A1* | 12/2016 | Manuel | G06K 9/00087 |
| 2016/0364729 A1* | 12/2016 | Ruparelia | G06Q 20/40145 |
| 2017/0032170 A1* | 2/2017 | Bazrafkan | G06K 9/00026 |
| 2017/0053108 A1* | 2/2017 | Jakobsson | H04L 63/0861 |
| 2017/0108939 A1* | 4/2017 | Chilmulwar | G06F 3/038 |
| 2017/0124370 A1* | 5/2017 | He | G06K 9/0012 |
| 2017/0295170 A1* | 10/2017 | Eramian | H04L 63/0853 |
| 2017/0337362 A1* | 11/2017 | Arunachalam | H04L 63/0861 |
| 2017/0359180 A1* | 12/2017 | Choi | H04L 9/3263 |
| 2018/0020348 A1* | 1/2018 | Peterson | H04W 12/06 |
| 2018/0060547 A1* | 3/2018 | Holz | G06F 21/6245 |

OTHER PUBLICATIONS

Kulkarni et al., Secure Biometrics: Finger Knuckle Print, International Journal of Advanced Research in Computer and Communication Engineering vol. 1, Issue 10, Dec. 2012.*

Kayaoglu et al., Biometric Matching and Fusion System for Fingerprints from Non-Distal Phalanges, 2TUBITAK—BILGEM, Informatics and Information Security Research Center, Turkey, May 15, 2015.*

Liu et al., Distal-Interphalangeal-Crease-Based User Authentication System, IEEE, Sep. 2013.*

(56) References Cited

OTHER PUBLICATIONS

Zhang et al., Finger-Knuckle-Print: A New Biometric Identifier, IEEE, 2009.*

* cited by examiner

PHALANGEAL AUTHENTICATION DEVICE

FIELD OF THE INVENTION

Embodiments of the invention are directed to a novel phalangeal authentication device that is configured to capture phalangeal credentials of users and facilitate phalangeal authentication for user activities.

BACKGROUND

Typically, users are required to provide authentication credentials for performing one or more user activities. In this regard, the user may be required to slide cards with magnetic strips, provide one or more identifiers, and often be required to provide the accompanying validation information associated with the individual transaction terminal and/or the individual card provided for authentication. Furthermore, in addition to being time consuming due to undesirable wait times, the present system requires the users carry the cards, and memorize the validation information for authenticating user activities. Carrying multiple cards/devices may be cumbersome for the user, and may be fraught with security concerns since the cards often comprise the user's personal and financial information. Furthermore, in some instances, the user may be reluctant to provide personal financial information in public terminals, terminals whose provenance is unknown to the user, or devices without secure connections, and therefore be unable to perform the desired user activity. Thus, a need presently exists for a secure and accurate technical device and system of authorizing and/or authenticating the user electronically, based on credentials that are readily available to the user, which addresses the above listed shortcomings of conventional activities at transaction terminals.

SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for phalangeal authentication of a user to enable the user to perform one or more user activities. Particularly, embodiments of the present invention are directed to a phalangeal authentication device comprising: a tactile interface screen configured to receive phalangeal credentials; one or more phalangeal credential sensor devices configured for capture and imaging of phalangeal credentials, the one or more phalangeal credential sensor devices comprising optical sensors, ultrasonic sensors, and capacitance sensors; and an image capture device. Furthermore, the invention may comprise a transaction terminal associated with the phalangeal authentication device, the transaction terminal comprising a user interface device for establishing audiovisual communication with the user. In one embodiment of the present invention, a system for phalangeal authentication is provided. The system typically provides a phalangeal authentication device configured for capture, customization and transformation of one or more phalangeal credentials of a user. The system may comprise a computer apparatus including at least one processor, at least one memory device, and a network communication device; and an authentication module stored in the at least one memory device comprising computer readable instructions, that when executed by the at least one processor, cause the at least one processor to: establish, via a network, an operative communication channel with a transaction terminal, the transaction terminal being associated with one or more phalangeal credential sensor devices; receive, via the operative communication channel, an indication of initiation of a user activity at the transaction terminal; capture, using the one or more phalangeal credential sensor devices, one or more phalangeal credentials of the user; analyze the one or more phalangeal credentials to identify the user; determine one or more phalangeal parameters associated with the one or more phalangeal credentials; validate the one or more phalangeal credentials and the one or more phalangeal parameters; determine at least one user activity associated with the phalangeal parameters; and transmit, via the operative communication channel, control instructions that cause the transaction terminal to implement the at least one activity.

In one embodiment, or in combination with the previous embodiment, the one or more phalangeal credential sensor devices comprise optical sensors, ultrasonic sensors, and/or capacitance sensors.

In one embodiment, or in combination with the previous embodiment, the optical sensors comprise an interface or terminal containing near-infrared LED (light-emitting diode) light and a monochrome CCD (charge-coupled device) camera.

In one embodiment, or in combination with any of the previous embodiments, the one or more phalangeal credentials are authentication credentials associated with phalanges of the user, wherein the one or more phalangeal credentials comprise fingerprint, finger veins, and/or digital bone anatomy.

In one embodiment, or in combination with any of the previous embodiments, the authentication module further comprises instructions that cause the at least one processor to transform the captured one or more phalangeal credentials into a first electronic form, wherein transforming further comprises: performing pre-processing of the captured one or more phalangeal credentials; extracting one or more features of the one or more phalangeal credentials; generating an electronic phalangeal credential template associated with the one or more phalangeal credentials; and storing the at least one phalangeal authentication credential in a storage device.

In one embodiment, or in combination with any of the previous embodiments, the authentication module further comprises instructions that cause the at least one processor to register the user for phalangeal authentication for a first time, wherein registering further comprises: requesting one or more authentication credentials from the user; authenticating the user for a first time based at least on the successful validation of the one or more authentication credentials received from the user; receiving a first phalangeal credential from the user, wherein the first phalangeal credential is configured to identify the user; determining one or more user activities associated with the user, wherein determining one or more user activities comprises determining a required authentication level associated with each of the one or more user activities; receiving a selection of at least one user activity from the user; determining at least one phalangeal credential associated with the selected at least one user activity based on at least the required authentication level for the at least one user activity; receiving the at least one phalangeal authentication credential from the user; and storing the at least one phalangeal authentication credential in an authentication database.

In one embodiment, or in combination with any of the previous embodiments, the one or more phalangeal credentials and the one or more phalangeal parameters are customizable by the user.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS OF THE INVENTION

Figure 1:
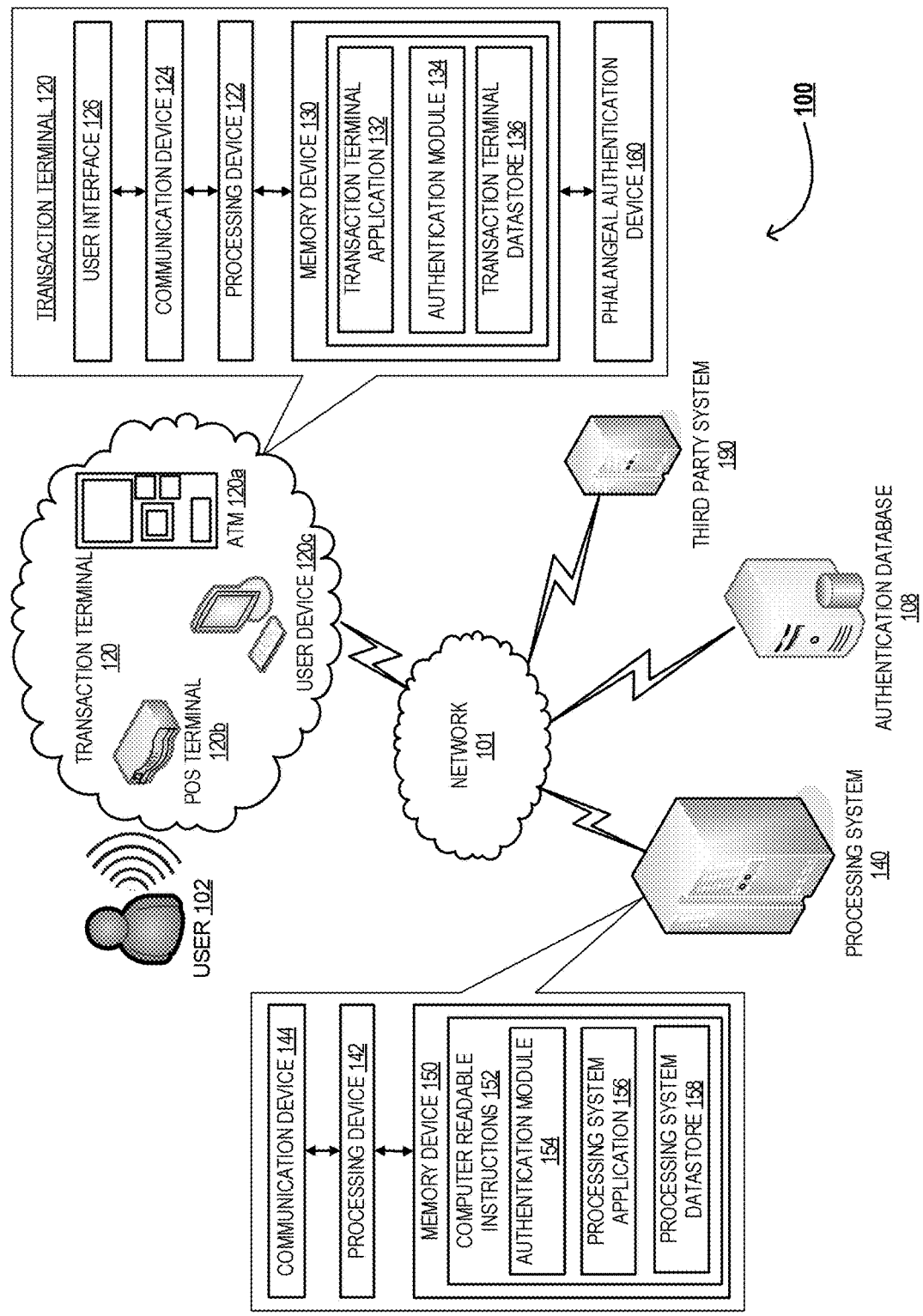
FIG. 1 illustrates a block network architecture diagram illustrating an authentication technology environment 100, in accordance with an embodiment of the invention.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In accordance with the embodiments of the invention, the term "phalangeal authentication credentials" or "phalangeal credentials" may refer to biometric credentials of the user that may be used to identify users and/or verify the identity of the user. Specifically, in some embodiments, phalangeal credentials may refer to biometric credentials associated with the user's phalanges. In this regard, the phalangeal credentials may refer to fingerprints, finger veins, palm veins, palm prints, digital bone anatomy/structure and positioning (distal phalanges, intermediate phalanges, proximal phalanges, and the like), and/or other features associated with the user's phalanges. It is contemplated that other biometric credentials of the user like iris recognition, retina scans, voice recognition, facial recognition, and the like may also be utilized in addition to the phalangeal credentials, in accordance with some embodiments of the invention.

In accordance with embodiments of the invention, the term "user" may refer to a customer or the like, who utilizes an external apparatus, terminal or device capable of facilitating transactions or activities. In accordance with embodiments of the invention, the term "entity" may refer to a customer, seller, merchant, or the like. In some embodiments, the term "entity" may refer to a financial institution or a financial entity.

The term "transaction terminal" as used herein may refer to one or more electronic devices that facilitate user transactions or activities. As such, the terms "user transaction" or "user activity" may refer to financial or non-financial transactions or activities. In some embodiments a transaction terminal refers to one or more devices that facilitate execution of financial transactions. In this regard the transaction terminals can comprise Automated Teller Machines (ATMs), Point of sale devices (POS), vending machines, checkout registers, ticket vending machines, automated retail transaction devices, banking terminals in a financial institution and other transaction terminals that involve financial transactions in one form or another. In some embodiments the transaction terminal refers to devices that facilitate execution of non-financial transactions or activities, for example, check-in terminals for various industries, for example: hospitality, travel, healthcare and the like, information kiosks and other transaction terminals that do not involve a user performing a financial transaction via the transaction terminal. In some embodiments the transaction terminals enable execution of both financial and non-financial transactions/activities. In some embodiments, transaction terminals may refer to user devices that facilitate financial and/or non-financial transactions, such as laptop computers, tablet computers, smartphones, wearable devices, personal digital assistants (PDAs), and other portable or stationary computing devices. In some embodiments, the transaction terminals may be owned, operated and/or otherwise associated entities and are installed at suitable locations, such that the user can travel to the location of the transaction terminal to execute transactions. In some embodiments, the transaction terminals may be owned, operated and/or otherwise associated with the user. The embodiments described herein may refer to the initiation and completion of a transaction.

In some embodiments, the user may be required to provide authentication credentials for conducting user transactions at the transaction terminal. Typically transaction terminals require the user to perform one or more authentication steps based on the level of authorization desired for a particular transaction. In this regard, the user may be required to slide cards with magnetic strips, provide one or more account numbers, userID and the like and often be required to provide the accompanying personal identification numbers (PIN), passwords, CVV numbers and the like associated with the individual transaction terminal and/or the individual card/account provided for authentication. Furthermore, in addition to being time consuming due to undesirable wait times, the present system requires the users to carry credit cards, debit cards, or other physical cards with magnetic strips or chips, and provide the corresponding PINs and passcodes to enable the user to perform transactions. Carrying multiple cards may be cumbersome for the user, and carting these cards around on a daily basis may be fraught with security concerns since the cards often comprise the user's personal and financial information. Furthermore, in some instances, the user may be reluctant to provide personal financial information in public terminals, terminals whose provenance is unknown to the user, or devices without secure connections, and therefore be unable to perform the desired transaction. In some instances, the various cards associated with the user are not interchangeable and the user is required to carry specific cards associated with specific transaction terminals to perform transactions. Typically, the user is required to carry separate cards or keys for the dame activity. For example, for the same activity of withdrawing funds from two separate accounts of the user, the user is required to present two separate cards, each associated with the account and the entity associated with the account. In other instances, although transaction terminals may accept cards other than the specific cards associated with the terminal, performing transactions with such cards may require added processing and additional wait times. However, this protracted process only marginally increases the security and confidence of the transaction, since the cards and the associated PINs may be available to unauthorized persons unbeknownst to the user, who may perform transactions with the user's credentials.

The present invention provides an innovative, secure and accurate technical system and method of authorizing and/or authenticating the user electronically, based on phalangeal credentials unique to the user, which addresses the above listed shortcomings of conventional transactions at transaction terminals. Typically, these phalangeal credentials relate to human physiology of the user, are always available to the user, without requiring separate transportation, do not need separate devices for initiating transactions, can be widely used, and are not easily replicated or misappropriated. Furthermore, the novel phalangeal authentication described herein, is infinitely customizable such that the user can register and use the specific type and combination of phalangeal credentials that the user is comfortable with and that the user may remember well. Although the present system involving cards may enable the user to choose a PIN, the user is however not able to customize the cards and other physical payment vehicles to suit the user's needs. As a result of the benefits of the present invention, the user can execute transactions using transition terminals in a reliable, efficient and convenient manner, with increased confidence in the transaction both for the user and the entity associated with the transaction. As such, the "phalangeal credentials", as used herein, may refer to fingerprints of one or more fingers or phalanges of the user, structure, shape, size and other characteristics of one or more fingers or phalanges of the user, and/or other biometric credentials of the user. In some embodiments, the phalangeal credentials may also comprise or may be accompanied by other biometric credentials of the user like voice recognition, iris scans, facial recognition, and the like.

In general, embodiments of the present invention relate to electronic systems, apparatuses, methods and computer program products for authenticating and/or authorizing one or more user transactions at a transaction terminal using phalangeal credentials of the user. A transaction terminal is provided that has been equipped with a phalangeal authentication device/interface for retrieving phalangeal credentials of the user. In this regard, in some embodiments, the phalangeal authentication interface may be a built-in feature of the transaction terminal. In other embodiments, a stand-alone phalangeal authentication device is provided that is configured to establish an operative communication channel with the transaction terminal to transmit the phalangeal credentials received from the user.

Referring to FIG. 1, a block diagram illustrating an authentication technology environment 100 configured for facilitating a user activity via a phalangeal authentication device 160 is shown. As illustrated, the authentication technology environment 100 may comprise a transaction terminal 120, a phalangeal authentication device 160, a processing system 140, an authentication database 108, and/or a third party system 190 in operative communication via a network 101. The authentication technology environment 100 may include a phalangeal authentication device 160 and/or a transaction terminal 120 operated by a user 102 who may be a customer who wants to make a transaction.

Typically, the processing system 140, the authentication database 108 are in electronic communication with the phalangeal authentication device 160, either directly or through the transaction terminal 120, via the network 101, which may be the Internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network.

In some embodiments, the phalangeal authentication device 160 may be a stand-alone device that is configured to facilitate the user activity, at least in part. In this regard, in some instances, the phalangeal authentication device is configured to be coupled to, or establish operative communication with a transaction terminal 120, such that the user 102 may conduct a user activity via the phalangeal authentication device 160 and/or the transaction terminal 120. Here, the phalangeal authentication device may be configured establish communication with other systems via network 101, either directly or via the transaction terminal 120. In other instances, where the phalangeal authentication device 160 may be configured to facilitate user activities, the terms phalangeal authentication device and the transaction terminal may be used interchangeably.

In other instances the phalangeal authentication device 160 may be integral with the transaction terminal 120. As such, in some embodiments, the authentication technology environment may comprise the transaction terminal 120, in communication with other systems via the network 101, as illustrated by FIG. 1. Therefore, the transaction terminal 120 may refer to one or more transaction terminal devices that are configured to be associated with or connected to the phalangeal authentication device 160, that are associated or connected to a phalangeal authentication device 160 and/or that comprise the phalangeal authentication device 160. The transaction terminal 120 may comprise an ATM 120a, a point of sale terminal 120b, a user device 120c, vending machines and/or other devices that are configured to facilitate the user activity. The user device 120c may comprise a mobile communication device, such as a cellular telecommunications device (i.e., a smart phone or mobile phone), a computing device such as a laptop computer, a personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like.

As illustrated in FIG. 1, the processing system 140 may include a communication device 144, a processing device 142, and a memory device 150 having an authentication module 154, a processing system application 156 and a processing system datastore 158 stored therein. As shown, the processing device 142 is operatively connected to and is configured to control and cause the communication device 144, and the memory device 150 to perform one or more functions. Furthermore, the processing device 142 is typically configured to control and cause the processing device 122 of the transaction terminal 120, and the phalangeal authentication device 160 to perform one or more functions. In some embodiments, the authentication module 154 and/or the processing system application 156 comprises computer readable instructions that when executed by the processing device 152 cause the processing device 142 to perform one or more functions and/or transmit control instructions to the transaction terminal 120, the phalangeal authentication device 160, the authentication database 108, the third party system 190, and/or the communication device 144. It will be understood that the authentication module 154 and/or the processing system application 156 may be executable to initiate, perform, complete, and/or facilitate one or more portions of any embodiment described and/or contemplated herein, and specifically embodiments directed to user activities. The authentication module 154 may comprise executable instructions associated with one or more authentication steps of user activities, and may me embodied within the processing system application 156 in some instances. The processing system 140 may be owned by, operated by and/or affiliated with financial institutions or other entities. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that may provide payment accounts for transactions. In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

The communication device 144 may generally include a modem, server, transceiver, and/or other devices for communicating with other devices on the network 101. The network communication device 144 may be a communication interface having one or more communication devices configured to communicate with one or more other devices on the network 101, such as the processing system 140, other processing systems, data systems, etc.

Additionally, referring to processing system 140, the processing device 142 may generally refer to a device or combination of devices having circuitry used for implementing the communication and/or logic functions of the processing system 140. For example, the processing device 142 may include a control unit, a digital signal processor device, a microprocessor device, and various analog-to-digital converters, digital-to-analog converters, and other support circuits and/or combinations of the foregoing. Control and signal processing functions of the system 140 may be allocated between these processing devices according to their respective capabilities. The processing device 142 may further include functionality to operate one or more software programs based on computer-executable program code thereof, which may be stored in a memory device 130, such as the processing system application 156 and the authentication module 154. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 142 may be configured to use the network communication interface of the communication device 144 to transmit and/or receive data and/or commands to and/or from the other devices/systems connected to the network 101.

Furthermore, a "user interface" (not illustrated) may be associated with the processing system 140 and may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface may employ certain input and output devices to input data received from the user 102 or output data to the user 102. These input and output devices may include a display, mouse, keyboard, button, touchpad, touch screen, microphone, speaker, light, joystick, switch, and/or other customer input/output device for communicating with one or more customers. In some embodiments, the user interface may be provided externally to the processing system, for example on one or more workstations connected to the system 140. As another example, the user interface may be provided on the transaction terminal 120, such as user interface 126, that may be controlled by the processing system 140 either directly or via the processing device 122 of the transaction terminal 120.

The memory device 150 within the processing system 140 may generally refer to a device or combination of devices that store one or more forms of computer-readable media for storing data and/or computer-executable program code/instructions. For example, the memory device 130 may include any computer memory that provides an actual or virtual space to temporarily or permanently store data and/or commands provided to the processing device 142 when it carries out its functions described herein. The processing system 140 may be used by a third party/entity 190 to interact with the transaction terminal 120, based on providing requisite authorization.

As further illustrated in FIG. 1, the transaction terminal 120 may include a communication device 124, a processing device 122, a user interface 126, a phalangeal authentication device 160 and a memory device 130 having an authentication module 134, a transaction terminal datastore 136 and a transaction terminal application 132 stored therein. The processing system 140 is typically configured to transmit control instructions to, and cause the processing device 122 to perform one or more steps of the embodiments presented herein. As shown, the processing device 122, in turn, is operatively connected to and is configured to control and cause the communication device 124, the user interface 126, the phalangeal authentication device 160 and the memory device 130 to perform one or more functions, at least in part. In some embodiments, the transaction terminal module and/or the authentication module 134 comprises computer readable instructions that when executed by the processing device 122 cause the processing device to perform one or more functions and/or transmit control instructions to the phalangeal authentication device 160, the communication device 124, the user interface 126, and the memory device 130.

The communication device 124 may comprise a modem, server, transceiver, and/or other device for communicating with other devices and systems on a network. The communication device 124 may further comprise a contact, contactless, wireless and/or wired interface that is configured to establish communication between the phalangeal authentication device 160 and the transaction terminal 120, as particularly the processing device 122 and in turn the processing system 140.

The user interface 126 of the transaction terminal 120 may include a display (e.g., a liquid crystal display, a touchscreen display, and/or the like) which is operatively coupled to the processing device 122. The user interface 126 may include any number of other devices allowing the transaction terminal 120 to transmit/receive data to/from a user, such as a keypad, keyboard, touch-screen, touchpad, microphone, mouse, joystick, other pointer device, button, soft key, and/or other input device(s). The user interface 126 may further comprise output devices including a display that provides instructions in information regarding the user activity and phalangeal authentication steps associated with the user activity. In some embodiments where the transaction terminal 120 requests the user's signature (if needed), the display may also serve as a touchpad input device to input the user's signature via a stylus. Other output devices may include one or more LEDs or an audio speaker, both which may indicate to the user that data has been successfully received from the phalangeal authentication device 160. A printer that can print paper receipts may also be incorporated into the transaction terminal 120.

As further illustrated in FIG. 1, the memory device 130 may include transaction terminal applications 132 and authentication module 134. In some embodiments, the transaction terminal applications 132 and/or the authentication module 134 may be executable to initiate, perform, complete, and/or facilitate one or more portions of any embodiment described and/or contemplated herein, either independently or in response to receiving control instructions from the processing system 140. In some instances the authentication module 134 is a part of the transaction terminal applications 132. Generally, the transaction terminal application 132 is executable to receive transaction instructions from the user and perform typical transaction terminal functions, as appreciated by those skilled in the art.

The transaction terminal 120 may require users to identify and/or authenticate themselves before the transaction terminal 120 may initiate, perform, complete, and/or facilitate a user activity. For example, in some embodiments, the transaction terminal 120 is configured (and/or the transaction terminal application 132 is executable) to authenticate a transaction terminal user based at least partially on a transaction terminal debit card, smart card, token (e.g., USB token, etc.), username, password, PIN, biometric information, and/or one or more other credentials that the user presents to the transaction terminal 120. Additionally or alternatively, in some embodiments, the transaction terminal 120 is configured to authenticate a user by using one-, two-, or multi-factor authentication. For example, in some embodiments, the transaction terminal 120 requires two-factor authentication, such that the user must provide a valid debit card and enter the correct PIN associated with the debit card in order to authenticate the user to the transaction terminal 120. However, either alternatively or in addition to the aforementioned authentication features, the transaction terminal 120 may require phalangeal authentication of the user 102 before initiating, performing, completing, and/or facilitating a user activity, as will be described in detail with respect to various embodiments of the invention.

Figure 2:
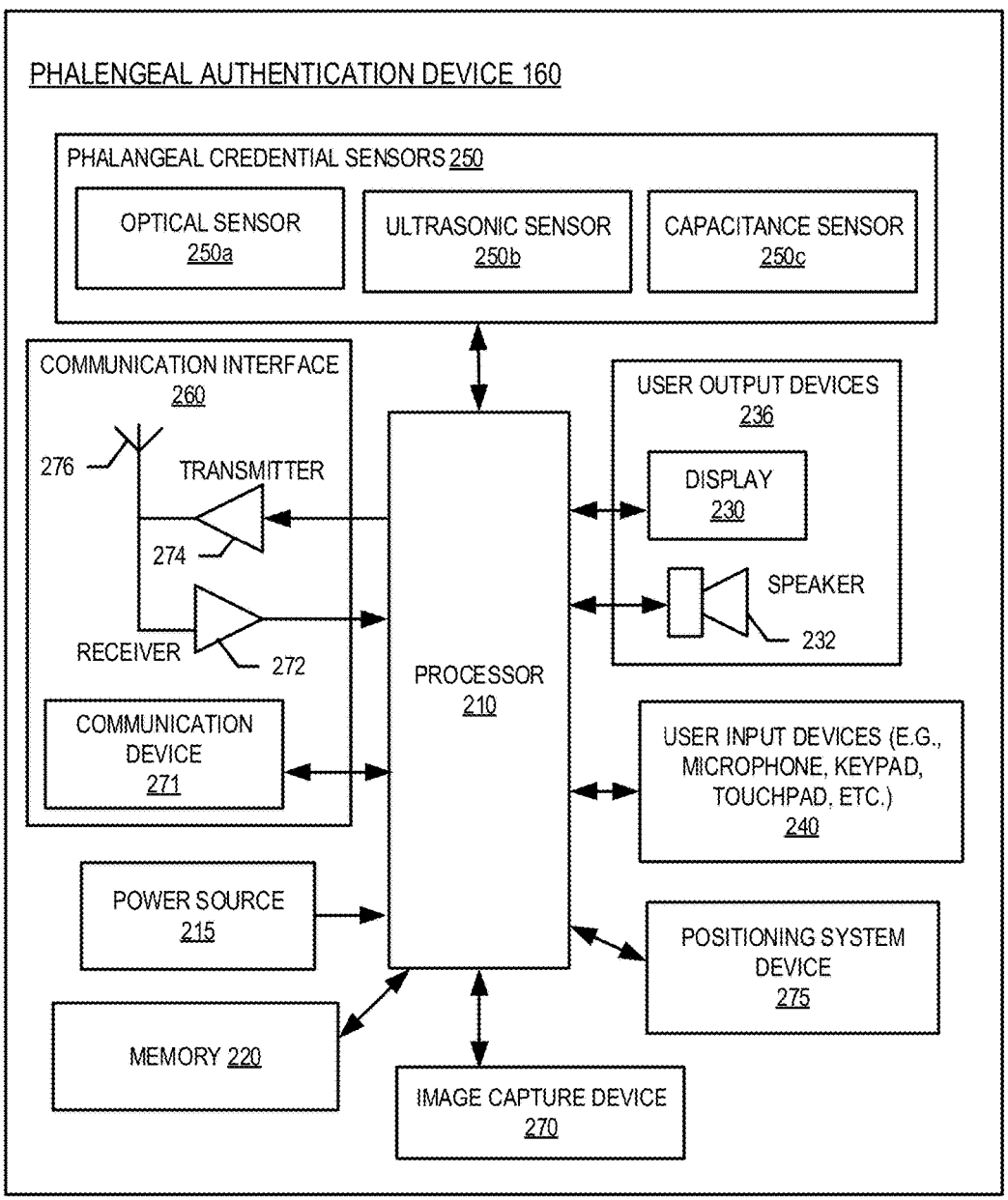
FIG. 2 illustrates a block diagram of a phalangeal authentication device 160, in accordance with an embodiment of the invention.

Referring now to FIG. 2, one embodiment of the phalangeal authentication device 160 is illustrated. The phalangeal authentication device is typically configured to receive phalangeal credentials from the user 102. In this regard, the phalangeal authentication device 160 may comprise one or more phalangeal credential sensors 250 that are configured to retrieve, receive, analyze and or validate phalangeal credentials associated with the user. In this regard, the phalangeal credential sensors 250 may comprise optical sensors 250*a*, ultrasonic sensors 250*b*, and/or capacitance sensors 250*c*. The one or more phalangeal credential sensors 250 may further comprise radio frequency, thermal, pressure, piezoresistive/piezoelectric, microelectromechanical sensors, and the like.

As outlined previously, authentication using phalangeal credentials of the user may comprise fingerprint recognition, finger vein recognition, and/or recognition of other phalangeal credentials like palm veins, palm prints, digital bone anatomy/structure and positioning. As such, the receiving phalangeal credentials may comprise the sensors 250 scanning/identifying/determining one or more phalanges/fingers of the user positioned appropriately on or proximate to the phalangeal credential sensors 250. In this regard, the user may choose to provide/scan one or more phalanges/fingers simultaneously, consecutively, in a pattern, in a predetermined sequence, and/or tap one or more phalanges/fingers simultaneously, consecutively, in a pattern, in a predetermined sequence. The phalangeal credential sensors 250 are typically configured to identify, recognize, and/or analyze the phalangeal credentials provided in the aforementioned ways.

The one or more phalangeal credential sensors 250, either singularly or in combination may be configured to recognize/receive the phalangeal credentials of the user and also determine one or more phalangeal parameters associated with the phalangeal credentials. Phalangeal parameters typically comprise characteristics of the phalangeal credentials provided by the user. In this regard, determining phalangeal parameters may comprise determining positioning and orientation of the phalanges/fingers of the user, determining pressure of the phalanges/fingers, identifying the fingers, determining a sequence and/or timing of the phalangeal pattern/tapping and the like.

In some embodiments, the phalangeal credential sensor 250 comprises an interface for the user to provide phalangeal credentials. In some embodiments, the one or more phalangeal credential sensors may comprise a common interface for receiving the credentials, while in other embodiments the phalangeal credential sensors may comprise multiple interfaces. In some instances, the interface takes the form of a tactile interface such as a screen of predetermined dimensions for the users to place their phalanges/fingers. This screen may be connected to one or more phalangeal credential sensors 250, such that the sensors 250 may the phalangeal credentials and the phalangeal parameters. The screen may be manufactured from any suitable material or a combination of materials, for example glass, plastics, metals, crystals (such as laser-cut sapphire crystal to preclude scratches), composites, non-metals and the like. In some instances, a portion of the screen comprises a detection interface such a predetermined region made out of stainless steel, a stainless steel layer, or a stainless steel ring surrounding the screen. The detection interface is configured to detect the user's fingers/phalanges even when the user is not pressing on the screen or even when the user is not applying the predetermined pressure required for conventional fingerprint scanners when placing his/her fingers on the screen for retrieval of phalangeal credentials. In some instances, either separately or in combination with the tactile interface, the interface takes the form of a contactless interface that is configured to retrieve one or more phalangeal credentials and/or determine one or more phalangeal parameters without physical contact between the user's phalanges/fingers and the interface. In this regard, the contactless interface may employ light waves, radio waves, and ultrasonic waves.

Optical sensors 250a typically involve optical imaging of the features of the user's phalanges/fingers using visible light. For, the optical sensor 250a may capture a digital image of a finger print or palm print. In some embodiments, the optical sensor 250 may comprise a top layer or touch surface for the user to place the phalanges/fingers and a layer is a light-emitting phosphor layer underneath for illuminating the surface of the finger. The light reflected from the finger/phalange may pass through the phosphor layer to an array of a charge-coupled device which captures a visual image used to identify the one or more phalanges/fingers, determine position and/or orientation of the phalanges, recognize fingerprints, identify tapping patterns, and other phalangeal credentials and phalangeal parameters. For example, multiple images may be generated in a predetermined frequency to determine the tapping pattern of the user. In other embodiments, the optical sensor 250a may comprise an interface or terminal containing near-infrared LED (light-emitting diode) light and a monochrome CCD (charge-coupled device) camera. This type of optical sensor may also be used for finger vein recognition, since the hemoglobin in the blood vessels absorbs near-infrared LED light, which makes the vein system appear as a dark pattern of lines that may be captured as an image for authentication of the user.

Ultrasonic sensors 250b typically involve creating visual images of the phalangeal credentials using high frequency sound waves that are configured to penetrate the epidermal layer of the skin such that fingerprints along the dermal layer of the skin may be captured. The dermal layer may reflect the sound waves, which may be captured to form an image of the fingerprint, determine positioning of the fingers and other phalangeal credentials and phalangeal parameters. The high frequency sound waves may be generated using piezoelectric transducers.

Capacitance Sensors 250c typically involve capturing images of the phalangeal credentials using the properties of a parallel plate capacitor. The capacitance sensors 250c typically comprise a sensor array pixels that each act as one plate of a parallel plate capacitor, while the electrically conductive dermal layer of skin acts as the second plate of the parallel plate capacitor. The capacitance sensor 250c is configured to determine the varying capacitance between the valleys and ridges of the dermal layer to generate the image, such as a fingerprint, for authentication. The change in measured capacitance may also be utilized to determine phalangeal parameters of the credentials. The capacitance sensors 250c may comprise active and/or passive capacitance sensors.

The phalangeal authentication device 160 may further include various features, such as a processor 210, such as a processing device or a microprocessor, communicably coupled to the phalangeal credential sensors 250, a memory device 220, user output devices 236, user input devices 240, a network communication interface 260 comprising a communication device 271, and/or a power source 215. Optionally, in other embodiments, the processor 210 may be coupled to other features of the phalangeal authentication device such as an image capture device 270, a positioning system device 275, and the like. In the embodiments where the phalangeal authentication device 160 is integral with the transaction terminal, the memory device 220 may refer to the memory device 130, the processor 210 may refer to the processing device 122, the network communication interface 260 may refer to the communication device 124 and/or the user output devices 236 and user input devices 240 may refer to the user interface 126.

Typically, the communication device 271 of the network communication interface 260 is configured to establish operative communication between the phalangeal authentication device 160 and the processing device 122 of the transaction terminal 120. In this regard, the communication interface 260 comprises a transmitter 274, a receiver 272 to transmit and receive signals from corresponding devices of the communication device 124 of the transaction terminal 120 via a suitable transmission medium or a communication channel. In some embodiments, the stand-alone phalangeal authentication device 160 is configured to be coupled/connected to the transaction terminal 120 via wired communication channel. For example, the communication device 271 may comprise a plug that may be inserted into a complementary port on the transaction terminal 271. In other embodiments, the stand-alone phalangeal authentication device 160 is configured to be coupled/connected to the transaction terminal 120 via a wireless and/or contactless communication channel. In this regard, the wireless communication channel may comprise near field communication (NFC), communication via radio waves, communication through the internet, communication via electromagnetic waves and the like. In one embodiment, the transaction terminal 120 may include a transceiver, i.e., one or more antennas and and/or other electronic circuitry, devices, and software, for receiving phalangeal credential/authentication data when the phalangeal authentication device 160 is held close to or tapped at a suitable location of the transaction terminal 120. Here, radio frequency signals may be transmitted and received in the radio frequency band, such as 13.56 MHz which is generally the frequency for NFC. In one embodiment, the ISO/IEC 14443 standard may define the protocol associated with the data carried by these radio frequency signals. In one embodiment, the transmitter 274 and receiver 272 at the mobile device may transmit and receive radio frequency signals, respectively, from the transaction terminal 120 within a distance of up to approximately 25 cm, and preferably from 0-20 cm, such as from 0-15 cm, and 0-10 cm.

Establishing the communication channels may also include signaling information in accordance with the air interface standard of the applicable cellular system of the wireless telephone network that may be part of the network 101. In this regard, the phalangeal authentication device 160 may be configured to operate with one or more air interface standards, communication protocols, modulation types, and access types. By way of illustration, the phalangeal authentication device 160 may be configured to operate in accordance with any of a number of first, second, third, and/or fourth-generation communication protocols and/or the like. For example, the phalangeal authentication device 160 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The phalangeal authentication device 160 may also be configured to operate in accordance with non-cellular communication mechanisms, such as via a wireless local area network (WLAN) or other communication/data networks.

Figure 3:
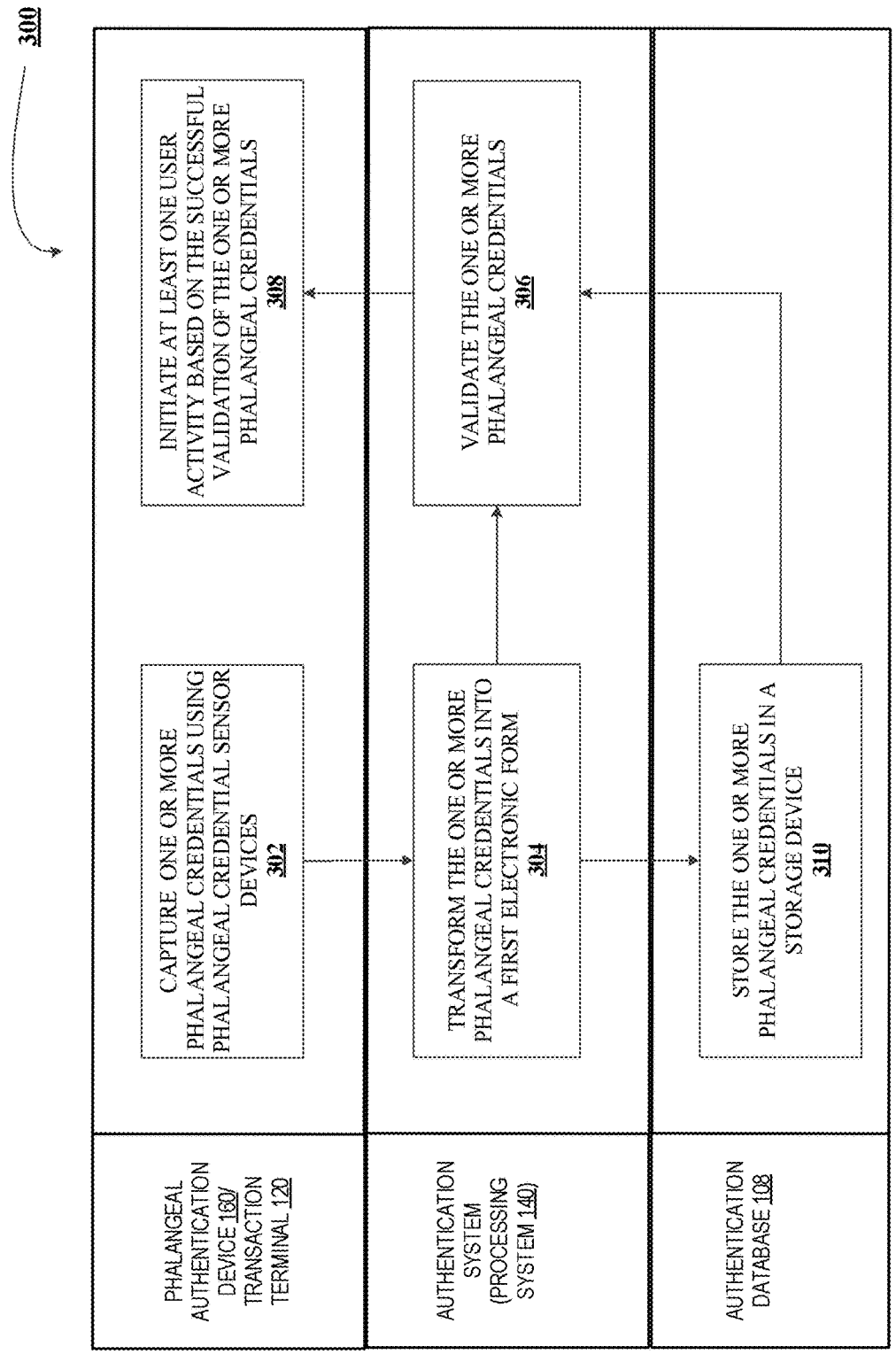
FIG. 3 illustrates a block diagram illustrating a high level process flow for phalangeal authentication of a user, in accordance with an embodiment of the invention.

Referring now to FIG. 3, illustrating a high level process flow 300 for phalangeal authentication of the user. At block 302, the system typically captures one or more phalangeal credentials using one or more phalangeal credential sensor devices. In this regard, the system may transmit control signals to the phalangeal credential sensor devices 250, which are configured to cause the phalangeal credential sensor devices 250 to capture the one or more phalangeal credentials of the user. In some embodiments, the "system" or the "authentication system" as used henceforth, may refer to the processing system 140. In other embodiments, the "system" may refer to the processing system 140, the transaction terminal 120, the phalangeal authentication device and/or other systems that are configured to initiate one or more steps of the process flows described herein.

Next, at block 304, the phalangeal authentication process 300 involves the transformation of the one or more phalangeal credentials into a first electronic form. In this regard, the system may fundamentally transform the captured phalangeal credentials to an electronic format that is configured to allow searching, granular formatting, comparison, validation and the like, as described with respect to FIG. 5. Typically, the authentication process 300 involves registration and/or enrollment of the user for at least a first time, so that the system may receive, record and store the phalangeal credentials of the user, as described in detail with respect to FIG. 4. After registration, the authentication system may then store the one or more phalangeal credentials in a storage device such as the authentication database 108, as illustrated by block 310. These stored one or more phalangeal credentials or "reference" phalangeal credentials, may then be used to authenticate future user activities. In this regard, the authentication system may perform validation of the one or more captured phalangeal credentials at 302 in light of the registered reference phalangeal credentials 310, as illustrated by block 306. Subsequently, at block 308, the system may initiate at least one user activity, by transmitting control signals to the transaction terminal 120, based at least on the successful validation of the one or more phalangeal credentials, as will be described later on with respect to FIG. 6.

Figure 4:
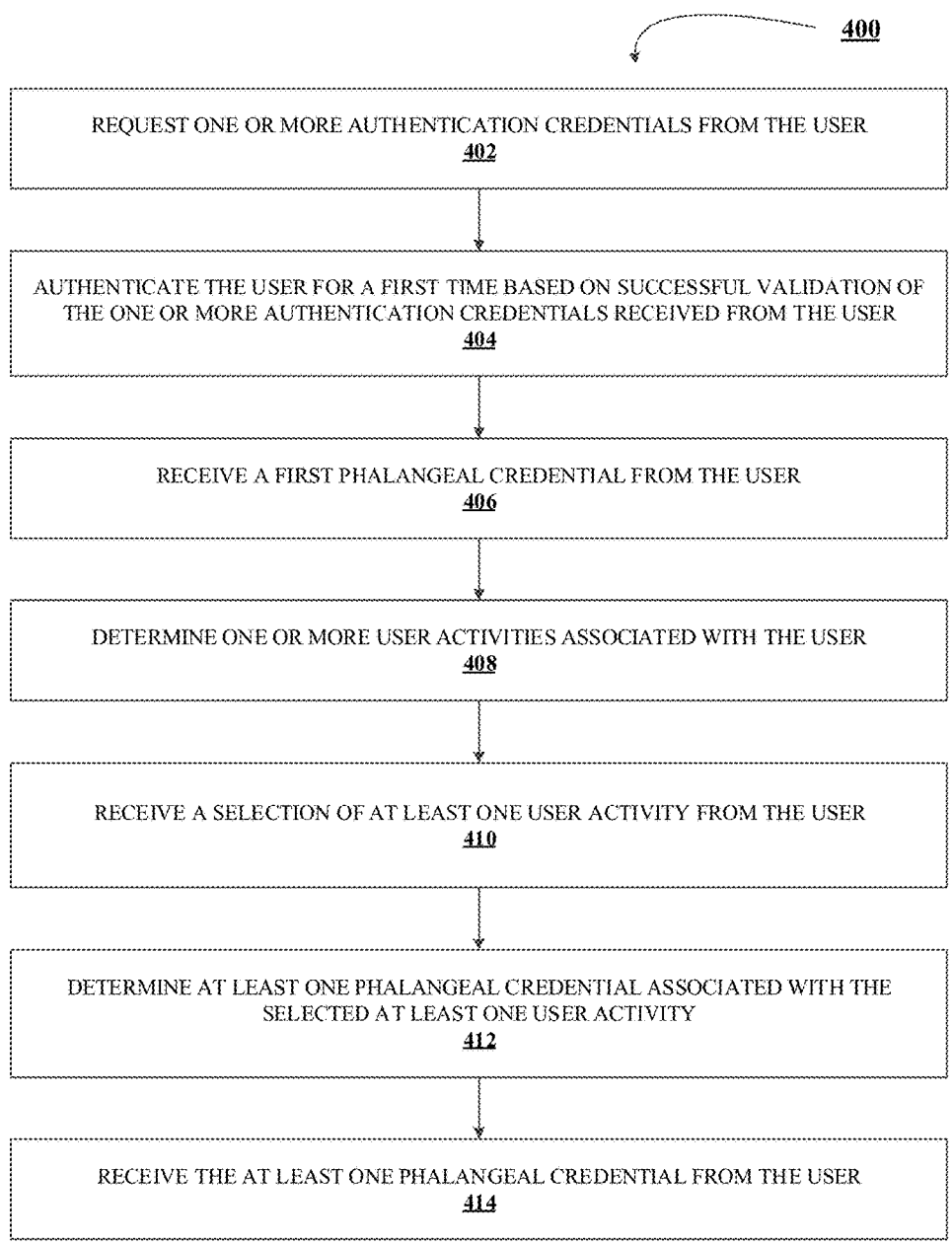
FIG. 4 illustrates a block diagram illustrating a high level process flow for registration of the user's phalangeal credentials, in accordance with an embodiment of the invention.

Referring now to FIG. 4, illustrating a high level process flow 400 for registration of the user's phalangeal credentials. Typically, the user may seek to enroll in phalangeal authentication provided/operated/facilitated by financial institutions or other entities. In some instances, the user may have a prior relationship with the financial institution or entity. For example, the user may have one or more accounts with the financial institution, with the accounts being associated with account identifiers/account numbers, with payment vehicles, like credit cards, chip cards, and/or with conventional authentication credentials like passcodes, personal identification numbers (PINs), CVV numbers, expiration dates and the like. However, the user may seek to utilize phalangeal authentication to authenticate/authorize one or more user activities associated with the user's accounts for its convenience, security, non-reproducibility, and widespread applicability, and to overcome the drawbacks of the conventional authentication credentials discussed previously. Alternatively, the user may seek to establish a new account with phalangeal authentication features.

The system may then request one or more authentication credentials from the user at block 402. These authentication credentials may be conventional authentication credentials or credentials already known to the financial institution or entity that may be used to identify and authenticate the user for a first time during registration. For example, the user may register for phalangeal authentication for a first time at a transaction terminal associated with a financial institution or another entity. In this regard, the user may authenticate himself/herself for using authentication credentials comprising inserting a debit card and providing an associated PIN for the registration process 400. As another example, in the instances of the user being associated with a digital wallet, the user may authenticate himself on a user device currently coupled to the transaction terminal, which then transmits an authentication token to the transaction terminal via a wireless communication channel, the authentication token comprising the validation of the user's credentials and a user device identifier. In some embodiments, the system may request additional credentials from the user to ensure the proper authentication of the user. In this regard, the system may present out of wallet questions, may seek other fanatical and/or personal information of the user to authenticate the user for registration. The user may be enabled to register via the process flow 400 in-person at a financial institution/entity location, at a transaction terminal or remotely via a user device that comprises the requisite capabilities. In this regard, the system may authenticate the user for a first time based on the successful validation of the one or more received authentication credentials at block 404. In this regard, this system may identify, authenticate and/or authorize the user based on validating the received authentication credentials at 402, in light of previously stored authentication details of the user in the authentication database.

Next at block 406, the system may request a first phalangeal credential from the user. In some embodiments, the first phalangeal credential of the user may refer to unique phalangeal credentials of the user that are typically not easily reproducible and that may be used for identification of the user. In selecting a particular phalangeal credential type, the following parameters may be considered, performance, prevention of circumvention and/or spoofing, robustness, population coverage, size of equipment needed and identity misappropriation deterrence. Selection of the particular phalangeal credential type may also be based on user requirements, authentication level required for anticipated user activities, sensor and device availability, computational time and reliability, cost, sensor size and power consumption, and the like.

As an example, the first phalangeal credential may involve fingerprints and/or vein or blood vessel patterns of one or more phalanges of the user. In some instances, the system may seek to capture credentials associated with multiple phalanges of the user. For example, the system and/or the user may seek to capture fingerprints, and/or vein patterns of one or more (or all) phalanges/fingers on both hands of the user. On or more of the multiple first phalangeal credentials of the multiple phalanges/fingers may be utilized later on for authenticating the user. Alternatively, the first phalangeal credential may comprise fingerprints or vein patterns of a specific combination of phalanges/fingers. For example, the user may place the index finger of the left hand and the thumb of the right hand for capture of fingerprints/vein patterns as a first phalangeal credential. As another example, the first phalangeal credential may comprise fingerprints/vein patterns of a ring finger and the index finger of the right hand of the user. Therefore, the credentials themselves and the particular combination of fingers/phalanges may be required for activities requiring a first higher level of identification/authentication such as financial transactions at an ATM or entry permissions for the user's home or car or certain facilities, while the at least one of the credentials may be sufficient for activities requiring a second lower level of authentication such as viewing information at an information kiosk or printing tickets at a ticket vending machine. The features and steps involved in capturing the phalangeal credentials from the user will be described in detail with respect to FIG. 5.

Next, the system may determine one or more user activities associated with the user, as illustrated by block 408. In this regard, the system may determine one or more previous user activities of the user that required authentication and may also identify or anticipate one or more future activities of the user. In some embodiments, the system may receive one or more user activities from the user. Determining one or more user activities may further comprise determining an authentication level required for each of the user activity. For example, the user activities such as opening a smart door of the user's home, starting the user's vehicle, financial transactions this involve withdrawal or outgoing transfers, purchases above a predetermined purchase limit at a point of sale terminal, may require a first high level of authentication. User activities such as financial transfers between user's accounts, viewing account information on an ATM or a transaction terminal, printing pre-purchased tickets at a ticket vending machine, purchases below another predetermined purchase limit, may be determined to require a second moderate level of authentication lower than the first level of authentication. Other user activities, such as turning lighting devices on and off remotely, viewing information at an information kiosk and the like may be determined to require a third lower level of authentication. Therefore, the one or more user activities may be categorized based on an authentication continuum. Although three descending levels of authentication are described here, first, second, and third, more or fewer levels may be determined. For example, a topmost level of authentication higher than the first level of authentication may be determined to be required for user activities such as changes to the authentication profile of the user, modification of account preferences and the like.

Next, the system may receive a selection of at least one user activity from the user at block 410. The user may select at least one user activity of the one or more determined user activities for phalangeal authentication. The user may select the at least one user activity one after another in a sequence or may choose the activities all at once. The system may then determine at least one phalangeal credential associated with the selected at least one user activity, as illustrated by block 412. Determining the at least one phalangeal credential associated with each of the at least one user activity comprises determining one or more phalangeal credential types and/or one or more types of phalangeal parameters that may singularly or in combination achieve the required authentication level for the activity. For example, for a user activity requiring the third lower level of authentication/the second moderate level of authentication, the system may determine that the received first phalangeal credentials from the user may be sufficient to identify and authenticate the user for the user activity. Here the at least one phalangeal credential may be the first phalangeal credential. As another example, the system may determine that additional phalangeal credentials and/or phalangeal parameters may be required in conjunction with the first phalangeal credentials. As discussed previously, phalangeal parameters typically comprise features, characteristics and attributes of the phalangeal credentials provided by the user. In this regard, determining phalangeal parameters may comprise determining positioning and orientation of the phalanges/fingers of the user, determining pressure of the phalanges/fingers, identifying the fingers, determining a sequence and/or timing of the phalangeal pattern/tapping and the like. The system may then receive the at least one phalangeal credential from the user, the at least one phalangeal credential either singularly or in combination with the phalangeal parameters possessing the requisite authentication level for the at least one user activity, at block 414.

For example, the system may determine that a first phalangeal credential comprising vein pattern of an index finger/phalange and the fingerprint of the thumb of the other hand of the user may provide a second moderate level of authentication. For a user activity of unlocking and opening a door of the user's house or vehicle requiring a first high level of authentication, the system may determine that a that a tapping sequence type phalangeal parameter together with the first phalangeal credential providing the moderate level of authentication, would result in the required first high level of authentication. Consequently, the system may transmit control instructions to a display device proximate the user, causing the display device to present a message requesting the user to provide a tapping sequence type phalangeal parameter in addition to the first phalangeal credentials. The system may also display one or more options associated with the phalangeal parameters. For example, the user may be informed that the tapping pattern may be provided by either or both of the index finger and the thumb of the user or alternatively by another finger/phalange of the user's choice. The user may place the index finger/phalange of a first hand and the thumb of the second had on the screen of the phalangeal sensor device as indicated by the system, and tap the index finger in a pattern and with a frequency that the user wishes. In this instance, based on the directions displayed by the system, the user may begin tapping of the index finger only after a predetermined period of time to allow the optical phalangeal scanner to first capture the vein pattern of the index finger/phalange.

In some embodiments, the system may enable the user to associate categories of user activities and/or user activity types with particular phalangeal credentials for ease of remembrance of the user. This feature will be illustrated with an example of a financial user activity, although it is understood that this and all other features described herein may find applicability on both financial and non-financial user activities. For example, the user may be associated with multiple accounts and may be able to perform multiple user activities associated with the accounts. The system may enable the user to register a first financial credential comprising fingerprints/vein patterns of the user' index finger and middle finger for a first financial account or payment instrument like a credit card. The system may further enable the user to register a second financial credential comprising the fingerprints/vein patterns of the user' index finger and ring finger for a second financial account. Therefore for a user activity comprising a purchase the user may provide the combination of fingers associated with the account the user wishes to debit. Here, the system may initiate processing of the purchase and authorize the purchase with the second account automatically based on determining that the user has provided the credentials associated with index finger and the middle finger. Therefore, the user is not required to carry multiple cards or mobile phones, or any other devices associated with the accounts, and spend time finding a choosing the right card, swiping the card, providing a PIN etc.

In some embodiments, the system may enable the user to associate/register one or more phalangeal credentials and/or phalangeal parameters associated with categories of user activities. Continuing with the previous example, the system may enable the user to register a first phalangeal parameter comprising applying a physical pressure (within a predetermined range) with the user's phalanges with the first user activity of viewing account information. The system may also enable the user to register a second phalangeal parameter comprising orienting the one or more of the user's phalanges is a predetermined fashion and swiping at least one phalange/finger in a predetermined direction, with a second user activity of making a cash withdrawal. Therefore, when the system via the sensor devices determines that the user is applying the predetermined amount of pressure with either the first financial credential or the second financial credential, the system may automatically display account balances associated with the corresponding account, without requiring presentation of multiple interfaces for the user to choose accounts, activities and authenticate himself/herself. Therefore, one phalangeal parameter associated with a particular activity may be applicable across multiple accounts associated with that activity.

In some embodiments, the system may enable the user to register misappropriation phalangeal credentials. In the event that the user may be compelled into performing a user activity by an unauthorized individual, the user may provide the misappropriation phalangeal credentials instead of the usual phalangeal credentials for the activity. On recognizing the misappropriation phalangeal credentials, the system may automatically initiate presentation of a mock interface with mockup financial information of the user, while automatically locking the accounts associated with the user, until the correct credentials are provided.

Therefore, this infinite customizability of phalangeal authentication of the present invention enables the user to choose the phalangeal credentials that are most comfortable to the user and that are most like to be recalled by the user. In some instances, tactile gestures of the phalangeal credentials may be easily recalled by the user in comparison with long alphanumeric strings. Furthermore, in addition to being extremely convenient for the user, and the present invention also prevents misappropriation since unauthorized individuals are exceedingly unlikely to obtain the phalangeal credentials of the various phalanges of the user and also determine the phalangeal parameters, much less determine the specific combinations of credentials and categories of credentials for particular user activities.

Figure 5:
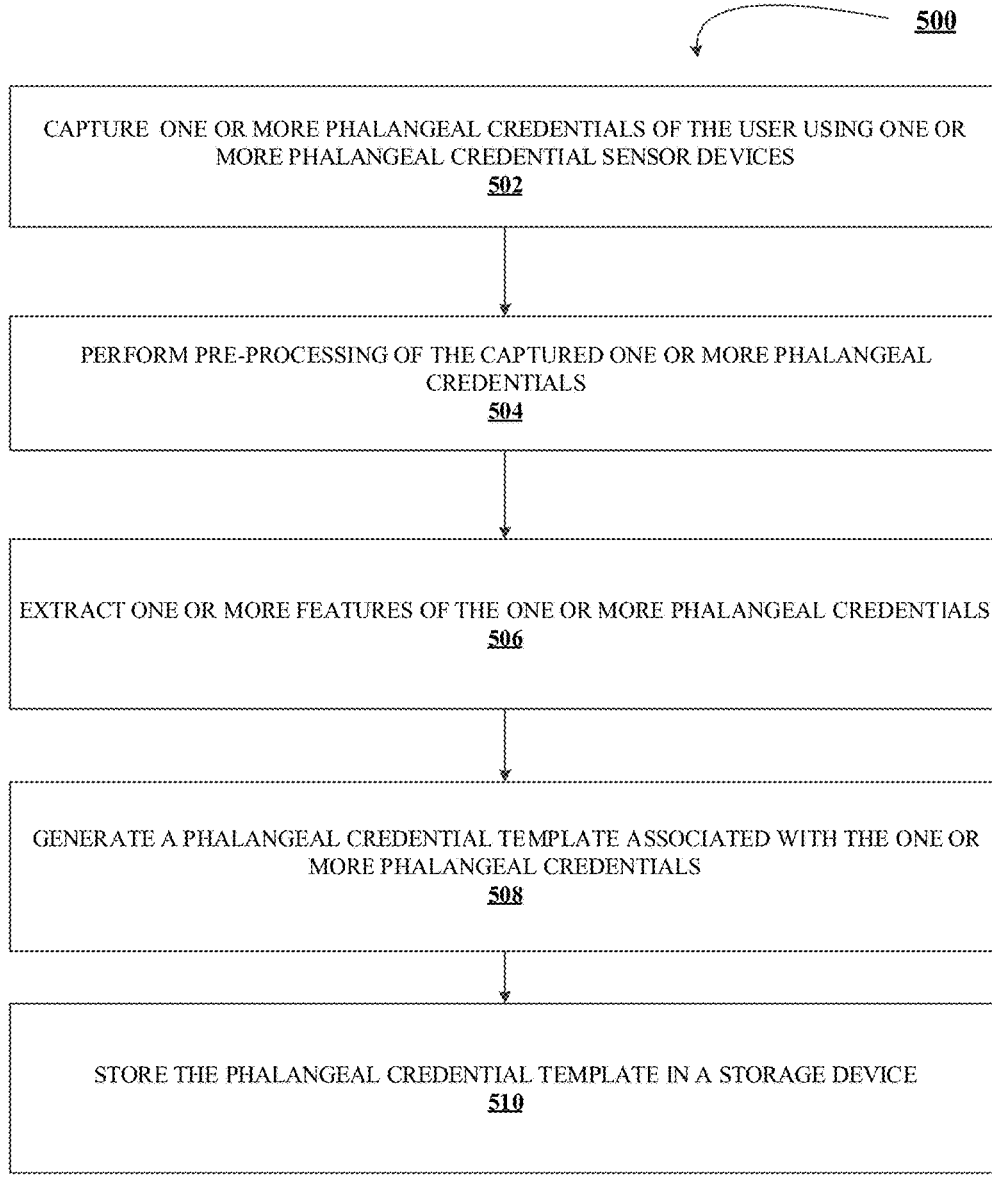
FIG. 5 illustrates a block diagram of a high level process flow for fundamental transformation of the phalangeal credentials, in accordance with an embodiment of the invention.

The credentials received by the system at block 414 during the process flow 400, may be stored in the authentication database to be used as references, for future authentication of user activities. The technical steps involved in receiving/capturing the one or more phalangeal credentials at blocks 406 and 414, and the technical processing and fundamental transformation of these phalangeal credentials will now be described in detail with respect to FIG. 5. FIG. 5, illustrates a high level process flow 500 illustrating fundamental transformation of the phalangeal credentials.

Initially, the system may capture one or more phalangeal credentials of the user using the one or more phalangeal credential sensor devices, as illustrated by block 502. The capturing of the one or more phalangeal credentials may be substantially similar to that described with respect to optical sensors 250*a*, ultrasonic sensors 250*b*, and/or capacitance sensors 250*c* of FIG. 2. Additionally, the phalangeal parameters may also be sensed/identified using the phalangeal credential sensors like radio frequency, thermal, pressure, piezoresistive/piezoelectric, microelectromechanical sensors, and the like. The one or more phalangeal credentials, as used henceforth, may refer to the first phalangeal credentials and the at least one phalangeal credentials receiving during the first time registration of the user. As discussed previously, capturing the one or more phalangeal credentials may comprise generating images of the provided phalanges/fingers. These images may be optical images, capacitive images and/or ultrasonic images. In some embodiments, capturing the one or more phalangeal credentials may comprise removing artifacts from the sensor, to enhance the input. In this regard, the system may transmit control signals to the phalangeal credential sensor devices, via the phalangeal authentication device.

The system may then perform pre-processing of the captured one or more phalangeal credentials, at block 504. In this regard, the system may remove background noise, normalize the image, and perform other image processing steps. Typically, pre-processing may involve transforming the optical images, capacitive images and/or ultrasonic images to a uniform format. Next, the system may extract one or more features of the one or more phalangeal credentials, as illustrated by block 506. In this regard, the system may determine the necessary features of the credentials that are required to authenticate the user and discard the rest of the image. Subsequently, the system may generate a phalangeal credential template associated with the one or more phalangeal credentials at block 508. In this regard, the system may create a vector of numbers to create a template. Typically, the template is a synthesis of the relevant characteristics extracted from the phalangeal credentials. Elements of the phalangeal credentials that are not required for identification/authentication of the user are discarded in the template to reduce the memory requirements and to protect the identity of the user. Typically, the template is an uniform electronic template comprising the relevant features of the phalangeal credentials and/or the phalangeal parameters that are required for phalangeal authentication.

Next the system may store the phalangeal credential template in a storage device at block 510. In the instances involving registration of the user, the system may store the phalangeal credentials templates in the authentication database. In this regard, the system may encrypt/encode the phalangeal credential templates prior to storing the templates in the database, such that the templates may only be accessed, retrieved or modified using s specific decoding key stored in a secure memory location of a system. In some embodiments, the system may conduct the steps 504 to 508 separately to generate separate templates for the phalangeal credentials and the phalangeal parameters. In this instance, the system may store the templates associated with the phalangeal credentials and the phalangeal parameters, in separate memory locations, databases and associate them using pointers and the like.

In the instances, where the steps 502-508, are being conducted for a pre-registered user, during a user activity, the system may store the phalangeal credential templates in temporary memory locations and compare them with extracted registered templates from the authentication database. The system may discard the templates after validation of the credentials.

Figure 6:
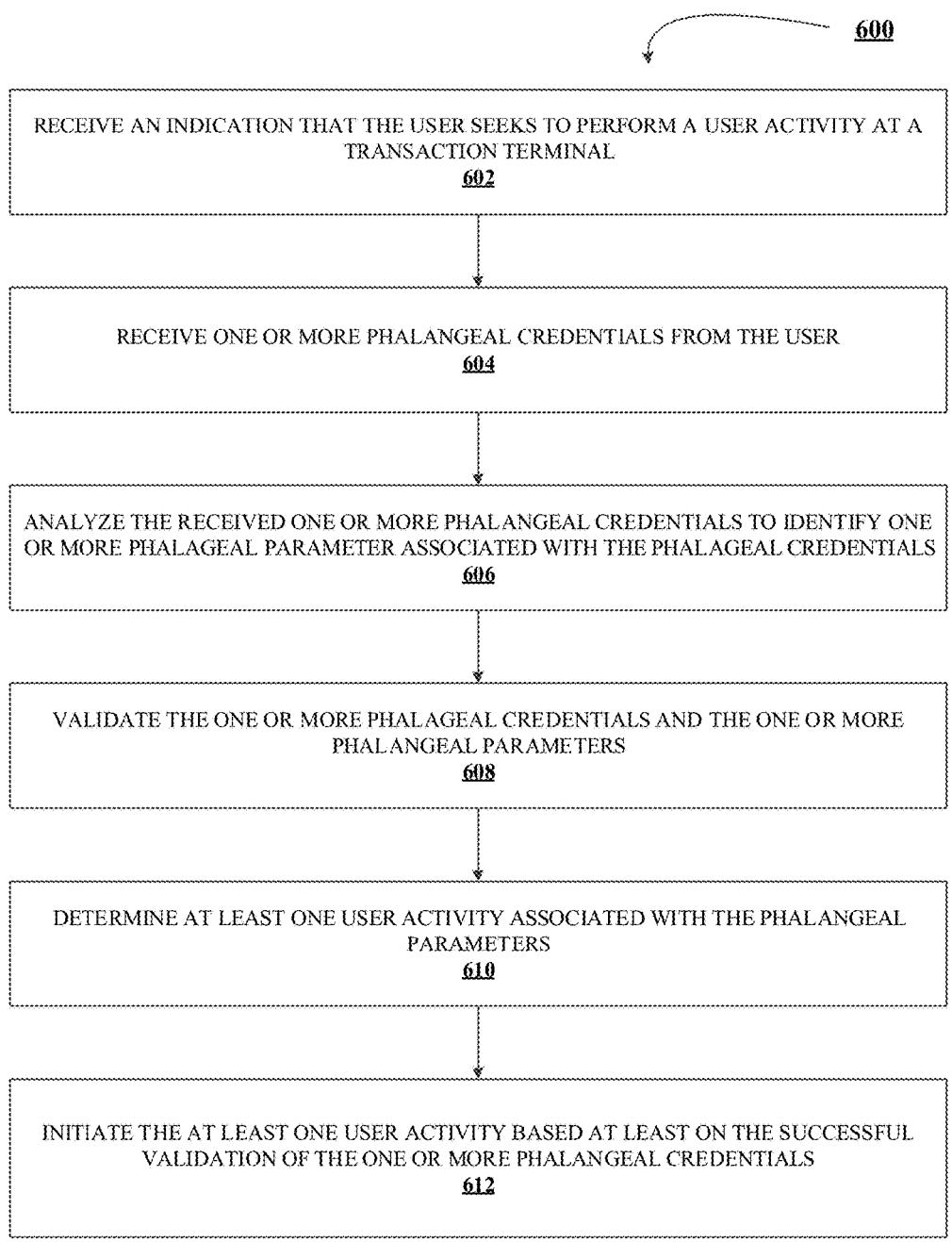
FIG. 6 illustrates a block diagram of a high level process flow for phalangeal authentication of a user during a user activity.

FIG. 6 illustrates a high level process flow 600 for phalangeal authentication of a user for initiating, conducting and/or completing a user activity. Initially, at block 602, the system may receive an indication that the user seeks to perform a user activity at a transaction terminal. In this regard, receiving the indication may comprise determining that the user is approaching or within a predetermined distance of the transaction terminal, the user tapping the transaction terminal, receiving the indication from a third party system, and/or receiving the indication from the user.

Next, the system may receive one or more phalangeal credentials from the user at block 604. The one or more phalangeal credentials may be captured and processed in a similar manner as described with respect to process flow 500. The system may then analyze the received one or more phalangeal credentials at block 606. In this regard, the system may first identify the user. In this regard, the system may analyze the one or more phalangeal credentials or the phalangeal credential template to determine the first phalangeal credential. The system may then extract the first phalangeal credential and compare it with reference templates retrieved from the authentication database. Comparing the first phalangeal credential with reference templates in the authentication database may comprise estimating the distance between them using an authentication algorithm (e.g. Hamming distance), to determine the best match. Subsequently, the system may establish the identity of the user. In this regard, the identification of the user may comprise positive recognition of the user. Furthermore, the system may determine user information based on the identification of the user.

Next, the system may analyze the phalangeal parameters associated with the phalangeal credentials. The system may compare the phalangeal parameters extracted from the template with phalangeal parameters retrieved from the authentication database to determine if the type and combination of phalangeal parameters are associated with the identified user. In this way the system may validate the one or more phalangeal credentials and the one or more phalangeal parameters associated with the user, as indicated by block 608. If the phalangeal parameters are determined to not be associated with the user/the user's first phalangeal credentials, the system may request the user to provide the phalangeal credentials again.

The system may then analyze the phalangeal credentials, the first phalangeal credentials and the phalangeal parameters to determine the associated user activity, at block 610. For example, the system may have registered the positioning of a user's phalange in a first directed to be associated with locking a door. As another example, the system may sense the presence, orientation and/or pressure of another phalange/finger in addition to those associated with the first phalangeal credentials to determine a user activity comprising the user fueling a vehicle. Based on at least identifying the at least one user activity associated with the phalangeal credentials and the successful validation of the phalangeal credentials, the system may initiate the at least one user activity, as illustrated by block 612. Initiating the user activity may comprise transmitting control instructions to the transaction terminal that are configured to cause the transaction terminal to execute, initiate, process and/or complete the user activity. For example, the system may transmit control signals to a transaction terminal to cause the transaction terminal authorize a transaction/user activity, to present notifications, to dispense one or more physical objects or receipts. In some embodiments, the system may initiate the transaction, such as a deposit transaction, a monetary transfer between accounts and the like and the like and cause the transaction terminal to preset confirmation and/or status of the user activity. As another example, the system may transmit control signals to a processing device (transaction terminal) of a smart door, which cause an actuator of the smart door to lock or unlock the smart door, depending on the received credentials. As yet another example, the system may transmit control instructions to a ignition device of a smart vehicle to cause the vehicle to start.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for phalangeal authentication, wherein the system provides a phalangeal authentication device configured for capture, customization and transformation of one or more phalangeal credentials of a user, comprising:
   a phalangeal authentication device comprising:
      a tactile interface screen configured to receive phalangeal credentials;
      one or more phalangeal credential sensor devices configured for capture and imaging of the phalangeal credentials, the one or more phalangeal credential sensor devices comprising optical sensors, ultrasonic sensors, and capacitance sensors; and
      an image capture device;
   a transaction terminal associated with the phalangeal authentication device, the transaction terminal comprising:
      a user interface device for establishing audiovisual communication with the user;
   a computer apparatus including at least one processor, at least one memory device, and a network communication device; and
   an authentication module stored in the at least one memory device comprising computer readable instructions, that when executed by the at least one processor, cause the at least one processor to:
      establish, via a network, an operative communication channel with the transaction terminal, the transaction terminal being associated with the one or more phalangeal credential sensor devices;
      receive, via the operative communication channel, an indication of initiation of a user activity at the transaction terminal;
      capture, using the one or more phalangeal credential sensor devices, one or more phalangeal credentials of the user, wherein the one or more phalangeal credentials are captured from phalanges of the user positioned at the tactile interface screen;
      analyze the one or more phalangeal credentials to identify the user;
      determine one or more phalangeal parameters associated with the one or more phalangeal credentials, wherein determining the one or more phalangeal parameters comprises at least one of determining a sequence and timing of a tapping pattern of the phalanges of the user, determining positioning the phalanges of the user, determining orientation of the phalanges of the user, determining physical pressure applied by the phalanges of the user, and identifying one or more predetermined phalanges of the user;
      validate the one or more phalangeal credentials and the one or more phalangeal parameters;
      analyze the one or more phalangeal parameters to determine at least one user activity associated with the one or more phalangeal parameters, wherein determining the at least one user activity comprises determining that the combination of the one or more phalangeal credentials and the one or more phalangeal parameters comprise a predetermined authentication level associated with the at least one user activity; and transmit, via the operative communication channel, control instructions that cause the transaction terminal to implement the at least one user activity.

2. The system of claim 1, wherein the optical sensors comprise an interface or terminal containing near-infrared LED (light-emitting diode) light and a monochrome CCD (charge-coupled device) camera.

3. The system of claim 1, wherein the one or more phalangeal credentials are authentication credentials associated with phalanges of the user, wherein the one or more phalangeal credentials comprise fingerprint, finger veins, and/or digital bone anatomy.

4. The system of claim 1, wherein the authentication module further comprises instructions that cause the at least one processor to transform the captured one or more phalangeal credentials into a first electronic form, wherein transforming further comprises:

performing pre-processing of the captured one or more phalangeal credentials;

extracting one or more features of the one or more phalangeal credentials;

generating an electronic phalangeal credential template associated with the one or more phalangeal credentials; and storing the at least one phalangeal authentication credential in a storage device.

5. The system of claim 1, wherein the authentication module further comprises instructions that cause the at least one processor to register the user for phalangeal authentication for a first time, wherein registering further comprises:

requesting one or more authentication credentials from the user;

authenticating the user for a first time based at least on the successful validation of the one or more authentication credentials received from the user;

receiving a first phalangeal credential from the user, wherein the first phalangeal credential is configured to identify the user;

determining one or more user activities associated with the user, wherein determining the one or more user activities comprises determining a required authentication level associated with each of the one or more user activities, wherein the one or more user activities are determined based on at least one of one or more previous activities of the user and one or more determined future activities of the user;

receiving a selection of at least one user activity from the user;

determining at least one phalangeal credential associated with the selected at least one user activity based on at least the required authentication level for the at least one user activity, wherein determining the at least one phalangeal credential comprises determining one or more phalangeal credential types and one or more types of phalangeal parameters associated with the at least one phalangeal credential, which in combination comprise the required authentication level for the at least one user activity;

receiving the at least one phalangeal authentication credential from the user; and storing the at least one phalangeal authentication credential in an authentication database.

6. The system of claim 5, wherein the one or more phalangeal credentials and the one or more phalangeal parameters are customizable by the user, wherein the registering further comprises:

displaying the determined one or more phalangeal credential types and one or more types of phalangeal parameters which in combination comprise the required authentication level for the at least one user activity;

wherein the received at least one phalangeal authentication credential from the user is associated with the a user choice of a phalangeal credential type of the one or more phalangeal credential types and a phalangeal parameter type of the one or more types of phalangeal parameters; and registering one or more misappropriation authentication credentials from the user;

wherein the one or more misappropriation authentication credentials are configured such that receiving the one or more misappropriation authentication credentials at the transaction terminal is configured to automatically (i) initiate presentation of a mock interface with mockup information of the user, and (ii) automatically locking accounts associated with the user until predetermined correct phalangeal credential credentials are received.

7. A computer program product for phalangeal authentication, wherein the computer program product is configured for capture, customization and transformation of one or more phalangeal credentials of a user, the computer program product comprising a non-transitory computer-readable storage medium having computer-executable instructions to:

establish, via a network, an operative communication channel with a transaction terminal, the transaction terminal being associated with one or more phalangeal credential sensor devices;

receive, via the operative communication channel, an indication of initiation of a user activity at the transaction terminal;

capture, using the one or more phalangeal credential sensor devices, one or more phalangeal credentials of the user, wherein the one or more phalangeal credentials are captured from phalanges of the user positioned at the tactile interface screen;

analyze the one or more phalangeal credentials to identify the user;

determine one or more phalangeal parameters associated with the one or more phalangeal credentials, wherein determining the one or more phalangeal parameters comprises at least one of determining a sequence and timing of a tapping pattern of the phalanges of the user, determining positioning the phalanges of the user, determining orientation of the phalanges of the user, determining physical pressure applied by the phalanges of the user, and identifying one or more predetermined phalanges of the user;

validate the one or more phalangeal credentials and the one or more phalangeal parameters;

analyze the one or more phalangeal parameters to determine at least one user activity associated with the one or more phalangeal parameters, wherein determining the at least one user activity comprises determining that the combination of the one or more phalangeal credentials and the one or more phalangeal parameters comprise a predetermined authentication level associated with the at least one user activity; and transmit, via the operative communication channel, control instructions that cause the transaction terminal to implement the at least one user activity.

8. The computer program product of claim 7, wherein the one or more phalangeal credential sensor devices comprise optical sensors, ultrasonic sensors, and/or capacitance sensors.

9. The computer program product of claim 8, wherein the optical sensors comprise an interface or terminal containing near-infrared LED (light-emitting diode) light and a monochrome CCD (charge-coupled device) camera.

10. The computer program product of claim 7, wherein the one or more phalangeal credentials are authentication credentials associated with phalanges of the user, wherein the one or more phalangeal credentials comprise fingerprint, finger veins, and/or digital bone anatomy.

11. The computer program product of claim 7, wherein the non-transitory computer-readable storage medium further has computer-executable instructions to transform the captured one or more phalangeal credentials into a first electronic form, wherein transforming further comprises:
   performing pre-processing of the captured one or more phalangeal credentials;
   extracting one or more features of the one or more phalangeal credentials;
   generating an electronic phalangeal credential template associated with the one or more phalangeal credentials; and
   storing the at least one phalangeal authentication credential in a storage device.

12. The computer program product of claim 7, wherein the non-transitory computer-readable storage medium further has computer-executable instructions to register the user for phalangeal authentication for a first time, wherein registering further comprises:
   requesting one or more authentication credentials from the user;
   authenticating the user for a first time based at least on the successful validation of the one or more authentication credentials received from the user;
   receiving a first phalangeal credential from the user, wherein the first phalangeal credential is configured to identify the user;
   determining one or more user activities associated with the user, wherein determining the one or more user activities comprises determining a required authentication level associated with each of the one or more user activities, wherein the one or more user activities are determined based on at least one of one or more previous activities of the user and one or more determined future activities of the user;
   receiving a selection of at least one user activity from the user;
   determining at least one phalangeal credential associated with the selected at least one user activity based on at least the required authentication level for the at least one user activity, wherein determining the at least one phalangeal credential comprises determining one or more phalangeal credential types and one or more types of phalangeal parameters associated with the at least one phalangeal credential, which in combination comprise the required authentication level for the at least one user activity;
   receiving the at least one phalangeal authentication credential from the user; and
   storing the at least one phalangeal authentication credential in an authentication database.

13. The computer program product of claim 12, wherein the one or more phalangeal credentials and the one or more phalangeal parameters are customizable by the user, wherein the registering further comprises:
   displaying the determined one or more phalangeal credential types and one or more types of phalangeal parameters which in combination comprise the required authentication level for the at least one user activity;
   wherein the received at least one phalangeal authentication credential from the user is associated with the a user choice of a phalangeal credential type of the one or more phalangeal credential types and a phalangeal parameter type of the one or more types of phalangeal parameters; and
   registering one or more misappropriation authentication credentials from the user;
   wherein the one or more misappropriation authentication credentials are configured such that receiving the one or more misappropriation authentication credentials at the transaction terminal is configured to automatically (i) initiate presentation of a mock interface with mockup information of the user, and (ii) automatically locking accounts associated with the user until predetermined correct phalangeal credential credentials are received.

14. A computerized method for phalangeal authentication, wherein the method is configured for capture, customization and transformation of one or more phalangeal credentials of a user, the method comprising:
   establishing, via a network, an operative communication channel with a transaction terminal, the transaction terminal being associated with one or more phalangeal credential sensor devices;
   receiving, via the operative communication channel, an indication of initiation of a user activity at the transaction terminal;
   capturing, using the one or more phalangeal credential sensor devices, one or more phalangeal credentials of the user, wherein the one or more phalangeal credentials are captured from phalanges of the user positioned at the tactile interface screen;
   analyzing the one or more phalangeal credentials to identify the user;
   determining one or more phalangeal parameters associated with the one or more phalangeal credentials, wherein determining the one or more phalangeal parameters comprises at least one of determining a sequence and timing of a tapping pattern of the phalanges of the user, determining positioning the phalanges of the user, determining orientation of the phalanges of the user, determining physical pressure applied by the phalanges of the user, and identifying one or more predetermined phalanges of the user;
   validating the one or more phalangeal credentials and the one or more phalangeal parameters;
   analyzing the one or more phalangeal parameters to determine at least one user activity associated with the one or more phalangeal parameters, wherein determining the at least one user activity comprises determining that the combination of the one or more phalangeal credentials and the one or more phalangeal parameters comprise a predetermined authentication level associated with the at least one user activity; and
   transmitting, via the operative communication channel, control instructions that cause the transaction terminal to implement the at least one user activity.

15. The computerized method of claim 14, wherein the one or more phalangeal credential sensor devices comprise optical sensors, ultrasonic sensors, and/or capacitance sensors.

16. The system of claim 15, wherein the optical sensors comprise an interface or terminal containing near-infrared LED (light-emitting diode) light and a monochrome CCD (charge-coupled device) camera.

17. The computerized method of claim 14, wherein the one or more phalangeal credentials are authentication credentials associated with phalanges of the user, wherein the one or more phalangeal credentials comprise fingerprint, finger veins, and/or digital bone anatomy.

18. The computerized method of claim 14, wherein the method further comprises transforming the captured one or more phalangeal credentials into a first electronic form, wherein transforming further comprises:
   performing pre-processing of the captured one or more phalangeal credentials;
   extracting one or more features of the one or more phalangeal credentials;
   generating an electronic phalangeal credential template associated with the one or more phalangeal credentials; and
   storing the at least one phalangeal authentication credential in a storage device.

19. The computerized method of claim 14, wherein the method further comprises registering the user for phalangeal authentication for a first time, wherein registering further comprises:
   requesting one or more authentication credentials from the user;
   authenticating the user for a first time based at least on the successful validation of the one or more authentication credentials received from the user;
   receiving a first phalangeal credential from the user, wherein the first phalangeal credential is configured to identify the user;
   determining one or more user activities associated with the user, wherein determining the one or more user activities comprises determining a required authentication level associated with each of the one or more user activities, wherein the one or more user activities are determined based on at least one of one or more previous activities of the user and one or more determined future activities of the user;
   receiving a selection of at least one user activity from the user;
   determining at least one phalangeal credential associated with the selected at least one user activity based on at least the required authentication level for the at least one user activity, wherein determining the at least one phalangeal credential comprises determining one or more phalangeal credential types and one or more types of phalangeal parameters associated with the at least one phalangeal credential, which in combination comprise the required authentication level for the at least one user activity;
   receiving the at least one phalangeal authentication credential from the user; and
   storing the at least one phalangeal authentication credential in an authentication database.

20. The computerized method of claim 19, wherein the one or more phalangeal credentials and the one or more phalangeal parameters are customizable by the user, wherein the registering further comprises:
   displaying the determined one or more phalangeal credential types and one or more types of phalangeal parameters which in combination comprise the required authentication level for the at least one user activity;
   wherein the received at least one phalangeal authentication credential from the user is associated with the a user choice of a phalangeal credential type of the one or more phalangeal credential types and a phalangeal parameter type of the one or more types of phalangeal parameters; and
   registering one or more misappropriation authentication credentials from the user;
   wherein the one or more misappropriation authentication credentials are configured such that receiving the one or more misappropriation authentication credentials at the transaction terminal is configured to automatically (i) initiate presentation of a mock interface with mockup information of the user, and (ii) automatically locking accounts associated with the user until predetermined correct phalangeal credential credentials are received.

* * * * *